(12) United States Patent
Akamatsu (10) Patent No.: US 6,172,807 B1
(45) Date of Patent: Jan. 9, 2001

(54) STEREOSCOPIC IMAGE DISPLAY DEVICE (75) Inventor: Naoki Akamatsu, Yokohama (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/396,480

(22) Filed: Sep. 15, 1999

(30) Foreign Application Priority Data

Sep. 16, 1998 (JP) .................................................. 10-261732

(51) Int. Cl.⁷ ............................ G02B 27/22; H04N 13/04
(52) U.S. Cl. ............................ 359/462; 359/464; 359/466; 348/51; 348/54
(58) Field of Search .................................. 359/462, 463, 359/464; 348/51, 54, 55, 59

(56) References Cited

U.S. PATENT DOCUMENTS 5,132,839 * 7/1992 Travis ..................................... 359/462

FOREIGN PATENT DOCUMENTS 6-225344 8/1994 (JP) .

OTHER PUBLICATIONS

"Beam Shaping Diffusion" Optical Alliance, Jun., 1998, pp. 5–8.

\* cited by examiner

Primary Examiner—Audrey Chang
(74) Attorney, Agent, or Firm—Pillsbury Madison & Sutro LLP (57) ABSTRACT

A stereoscopic image display device for providing a stereoscopic image by displaying images with a parallax on a viewer's left and right eyes is disclosed. The display device comprises the following. (1) A light source with selectively variable light-emitting regions for emitting light, wherein the light-emitting regions are disposed at various positions from a center of the light source. (2) An optical element having an optical axis extending through the center of the light source for condensing light emitted from the light source to each of the viewer's left and right eyes. (3) Spatial modulation means, disposed on an optical path from the light source to the viewer, for spatially modulating the light emitted from the light source. (4) Control means for controlling the light-emission state of the light source so that brightness of the light-emitting regions increases as the positions of the light-emitting regions become distant from the optical axis, in order to obtain a uniform viewing illuminance of the light viewed by the viewer even when a viewing point of the viewer changes and the positions of the light-emitting regions move.

12 Claims, 6 Drawing Sheets

STEREOSCOPIC IMAGE DISPLAY DEVICE

BACKGROUND OF THE INVENTION

This invention relates generally to a stereoscopic image display device which displays an image from a plurality of points of view with a stereoscopic vision, and more particularly to a stereoscopic image display device which converges spatially modulated light of left and right images having binocular parallax on the vicinities of the corresponding left and right eyes of a viewer to make the viewer recognize a stereoscopic image.

Recently, stereoscopic image display devices which use images having binocular parallax to make a viewer recognize them as a stereoscopic image are reported. Among them, attention has been paid to stereoscopic image display systems which do not require special spectacles since viewers can easily enjoy stereoscopic images.

Jpn. Pat. Appln. KOKAI Pub. No. 6-225344 discloses such a stereoscopic image display system which displays images while following the motion of a viewer, without requiring special spectacles. In this system, back-light for left and right sides is emitted through a large-sized convex lens to the position, or thereabouts, of the viewer's face or the viewer's left or right eyes. Therefore, since the position of light sources of back-light change as the viewer moves, a good tracking is achieved.

However, in this conventional art, as the viewer moves leftwards or rightwards from the front position, an angle φ formed between the light axis of incident light passing through the spatial modulation element and the surface of a liquid crystal board used as the spatial modulation element increases, and the amount of an orthogonal-projection component of incident light reduces. Further, in this conventional art, a black-and-white television wherein a phosphor-coated surface is used as a luminous member is used. The luminescent section of this light source can be regarded as a perfect diffusion light source whose luminance is uniform even if it is viewed from any angle. When the luminous intensity in the vertical direction is Io, the luminous intensity in the oblique direction is Io cos φ. Therefore, the luminous intensity has such characteristics that the luminous intensity reduces according to the degree of obliqueness of the direction in which the light source is viewed. Further, the liquid crystal board used as the spatial modulation element has such general characteristics that its transmissivity lowers when the light incident direction shifts from the vertical axis.

As explained above, in the conventional stereoscopic image display device, there were the problems that the image to be viewed becomes dim as the viewer moves leftwards or rightwards from the central position, and that the stereoscopically viewable region is narrow. Further, even when the viewer does not move, a peripheral portion of an image to be viewed is dimmer than a central portion.

BRIEF SUMMARY OF THE INVENTION

The object of the present invention is to provide a stereoscopic image display device, wherein an image to be viewed does not become dim even when the viewer moves leftwards and rightwards from the front position. The stereoscopically viewable possible region is widened, and a peripheral portion of an image to be viewed is not dimmer than a central portion even when the viewer does not move.

According to the present invention, there is provided a stereoscopic image display device for providing a stereoscopic image by displaying images with a parallax on a viewer's left and right eyes, comprising:

a light source with variable light-emitting regions for emitting light;

an optical element for condensing light emitted from the light source to each of the viewer's left and right eyes;

spatial modulation means, disposed on an optical path from the light source to the viewer, for spatially modulating the light emitted from the light source; and control means for controlling a luminous intensity of the light source to such a value that a viewing illuminance of the light viewed by the viewer becomes uniform.

By the above means, since the luminous intensity of the light source is controlled to such a value that the viewing illuminance at which the viewer views an image becomes uniform, an image with a uniform brightness can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

Figure 1:
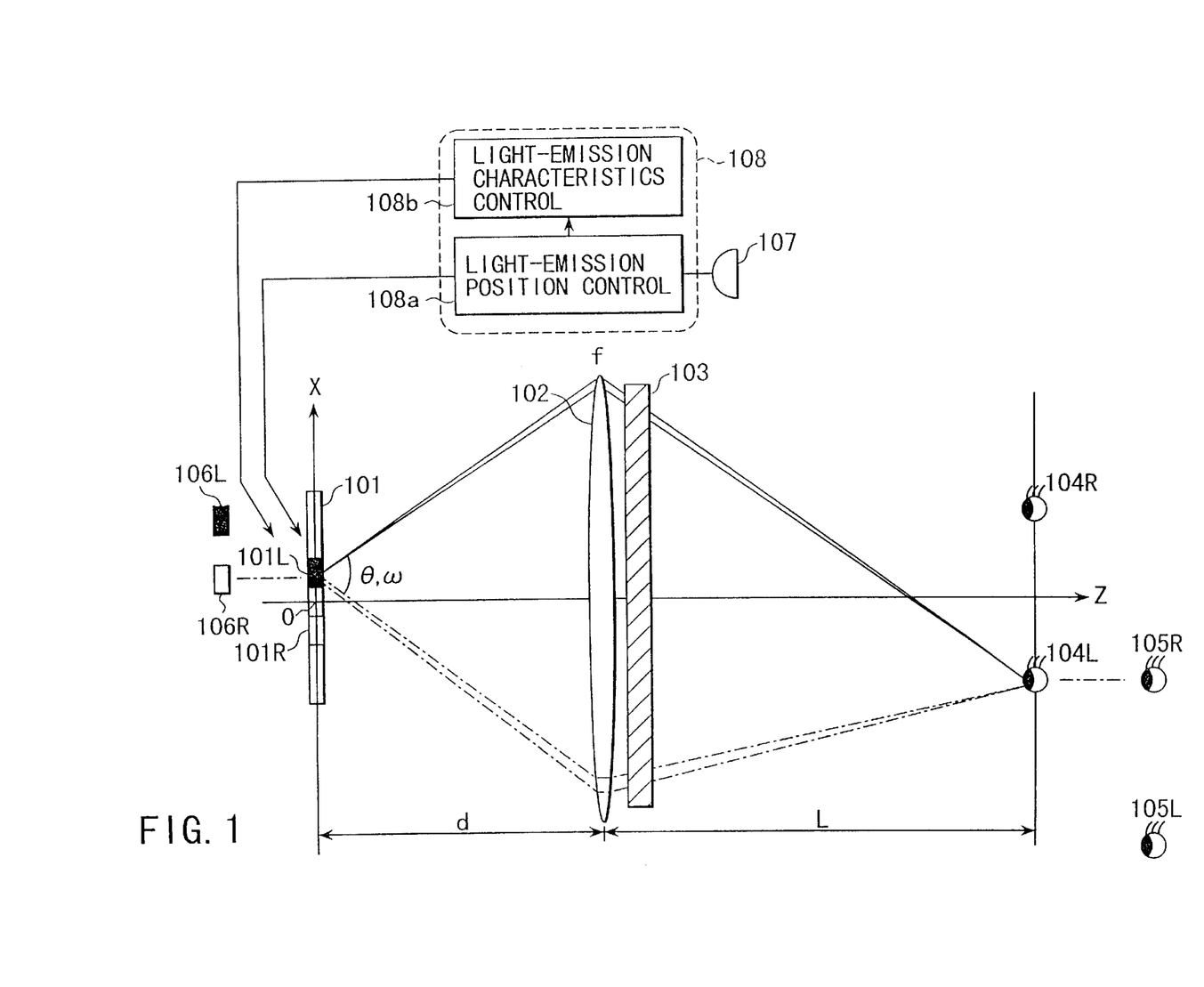
FIG. 1 is a schematic view of the structure of a stereoscopic image display device according to a first embodiment of the present invention.

FIG. 1 is a schematic view of the structure of a stereoscopic image display device according to a first embodiment of the present invention. In FIG. 1, a light source 101 has a light-emission region 101R and a light-emission region 101L which have variable light-emission positions. The light-emission region 101R for viewer's right eye (shown in white in the drawings) and light-emission region 101L for viewer's left eye (shown in black in the drawings) emit light according to a detection result of a sensor for detecting the positions of viewer's left and right eyes. Assume that the center of the light source 101 is an origin O. A Z-axis (an optical axis) is set to extend from the origin O in a direction perpendicular to the light source plane (the direction toward the viewer from the light source plane in FIG. 1). An X-axis is set in a direction of a straight line passing through the origin O on the light source plane (the direction from right-eye light-emission region 101R to left-eye light-emission region 101L in FIG. 1). A Y-axis is set in a direction perpendicular to the X-axis on the light source plane and the Z-axis (the direction vertical to the surface of the sheet of FIG. 1).

First, the operation of the present invention is described with respect to the left eye. The left-eye light-emission region 101L of light source 101 emits light. This emitted diffused light is made incident on large-sized convex lens 102 serving as optical element means. A Fresnel lens formed of resin is suitable for this convex lens 102, for example. The light from light source 101 is refracted by the convex lens 102 and thereafter made incident on a spatial modulation element 103. A transmission-type color liquid crystal panel is used for the spatial modulation element 103, for example. An image for the viewer's left eye, which is an output from a image display circuit (not shown), is displayed on the spatial modulation element 103. Light to be made incident on the spatial modulation element 103 is spatially-modulated according to a displayed image. This spatially-modulated light becomes transmission light, which is condensed and made incident on the viewer's left eye 104L and thereabouts.

Next, the operation of the present invention is described with respect to the right eye. In the same manner as the left eye, the right-eye light-emission region 101R of light source 101 emits light. Diffused light emitted from the light source 101 is made incident on the convex lens 102 and refracted. The light which has passed through the convex lens is made incident on the spatial modulation element 103. At this time a right-eye image which is an output from the image display circuit (not shown) is displayed on the spatial modulation element 103. The light made incident on the spatial modulation element 103 passes through the element 103, and is condensed and made incident on the viewer's right eye 104R and thereabouts.

When the above left-eye image display operation and right-eye image display operation are alternately and repeatedly performed at a high speed (for example, every 1/120 second), the viewer observes them as a stereoscopic image. In this embodiment, the members are arranged so that a so-called "formula of image formation"

$$(1/d)+(1/L)=(1/f)$$

is established, when the distance from the light source to convex lens 102 is d, when the focal distance of convex lens 102 is f, and when the distance from convex lens 102 to the viewer is L.

Further, this light source region 101L does not have to be a light-emission region exclusively used for the left eye. For example, when the viewer has moved leftwards and the right eye 105R has come to the position of the left eye 104L (when the left eye 104L has moved to the left), the light-emission regions for the left and right eyes of the light source become left-eye light-emission region 106L and right-eye light-emission region 106R, respectively. Since the light source region 101L and right-eye light-emission region 106R emit light in the same region, they illuminate convex lens 102 and spatial modulation element 103 in the same manner. In this case, an opening angle θ of light from the light source 101 in FIG. 1 in a XZ plane in the right-and-left direction is the same, and the total solid angle ω of light radiated on the spatial modulation element 103 is also the same between light source region 101L and right-eye light-emission region 106R. For example, when pixels of the spatial modulation element 103 are formed in a matrix of M (row)×N (column), a solid angle ω (m, n) and the effective beam and its direction are the same. Specifically, ideal light-emission characteristics for each light-emission region is determined without distinction of right and left.

The solid angle ω is a value indicating a degree of spread of a beam. For example, when an area of a part on the surface of a hemi-sphere having a radius of 1 is S and a solid angle of S associated with origin O is ω, ω=area/(radius)$^2$= S/1$^2$=S. Therefore, with respect to area S' of a part on the surface of a hemisphere having radius of 2 obtained by extending the radius of the above hemi-sphere in the direction in which beam a travels, the solid angle associated with origin O is also ω. As explained above, the solid angle indicates the degree of spread of a beam.

On the other hand, a sensor 107 which detects the position of the viewer senses the position of the viewer. When the viewer changes the position, sensor 107 outputs a detection result according to the changed position to a light-source control circuit 108. The light-source control circuit 108 comprises a light-emission position control circuit 108a and a light-emission characteristics control circuit 108b. The light-emission position control circuit 108a receives the detection result of sensor 107 and determines by calculation regions in light source 101 which have a image-forming relationship with the viewer's position corresponding to the detection result. This calculation result is inputted to the light-emission characteristics control circuit 108b. The light-emission characteristics control circuit 108b selects light emission regions of light source 101 to emit light, on the basis of the above calculation result. Further, the light-emission characteristics control circuit 108b controls the light-emission regions of light source 101 to emit light.

Figure 2:
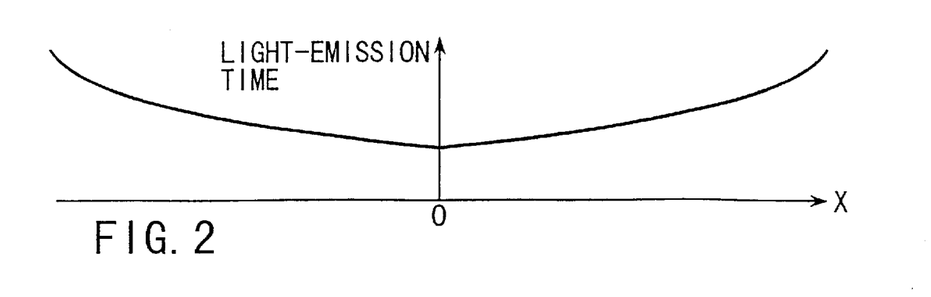
FIG. 2 is a graph showing the characteristics of a lighting time versus the distance of the light source from the optical axis origin.

As shown in FIG. 2, the light source 101 is set so that a light-emission time becomes longer according to the distance between the origin and the light-emission regions. For example, when display of left and right images is switched for every 1/120 second, the light-emission time of each light-emission region of light source 101 can be controlled within a variable range from 0 to 1/120 second. Further, when a plurality of regions including the light-emission regions and near regions thereof are simultaneously made to emit light, the light-emission time can be varied for each region.

A stereoscopic image can be viewed not only in the positions of the viewer's left and right eyes as described above, but in the vicinities of the viewer's left and right eyes.

Even when the viewer moves, a sufficient time and spatial margin can be provided for the responsivity of the light-source control circuit 108 and light source 101. In other words, the viewer can view a stereoscopic image even if he/she slightly moves. During this time the light-source control circuit 108 detects the movement of the viewer and adjusts the light-emission position of light source 101. Consequently, the time for which the viewer cannot view a stereoscopic image reduces.

Further, the light-emission time for the viewer's present position corresponding to the original light-emission region is made different from that for the viewer's position after moving, which is a region in the vicinity of the original light-emission region and thereby a change in illuminance of a viewed image between the positions is sufficiently reduced. Thus, the viewer can view the image without a sense of unnaturalness.

For example, the light-emission time for each light-emission region is determined as follows. Data on the optical system, including data on light-source light-emission regions and their light-source light-emission characteristics, lens and mirror, is used as parameters, and a computer simulation by beam tracing based on geometrical optics is performed. It thus suffices that the illuminance at the viewer's position before control is found, and that the light-emission time is controlled to make shorter the light-emission time for the light-emission region with high illuminance at the corresponding viewer's position and make longer the light-emission time for the light-emission region with low illuminance at the corresponding viewer's position.

Figure 3:
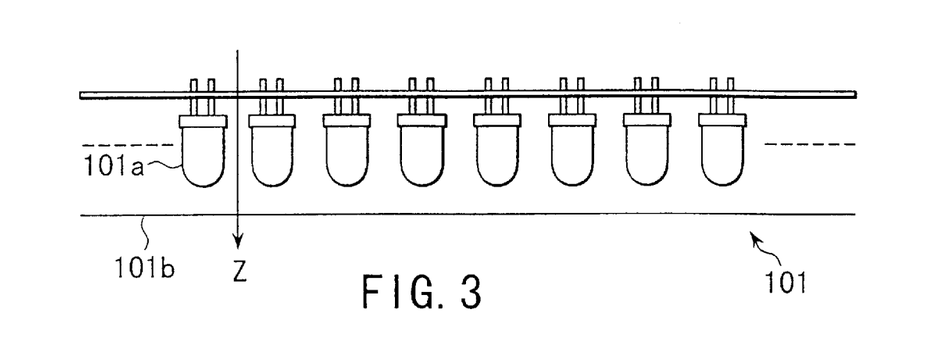
FIG. 3 is a diagram showing an example of the structure of the light source in FIG. 1.

The light source 101 comprises lamps 101a and diffusion board 101b, as shown in FIG. 3, for example. The lamps 101a are arranged in line. A conventional diffusion board 101b such as a milky glass board is disposed in front of this lamps 101a. Thereby, the light source 101 is obtained, wherein light is emitted by only lamps 101a in the light-emission regions or in the light-emission regions and near regions thereof. Further, aside from this, light-emission control can be achieved by using a light source having physically-movable lamps 101a and moving them to the light-emission region.

Figure 4:
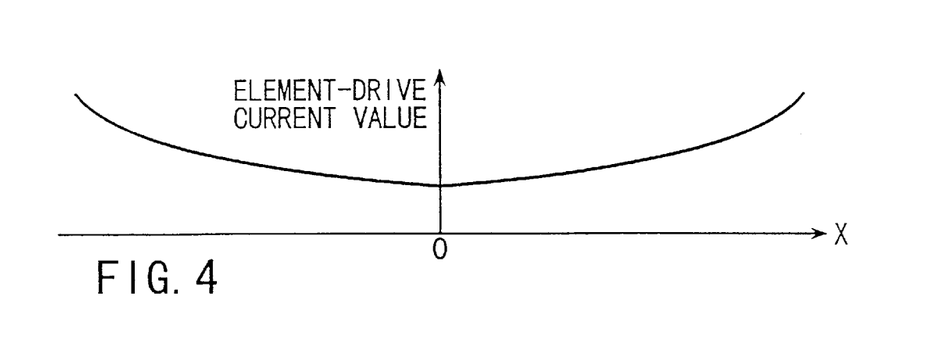
FIG. 4 is a graph showing the characteristics of current value of the light-emitting element versus the distance of the light source from the optical axis origin.

Though in the embodiment the light-emission time of light source 101 is controlled, the light source may be formed of elements whose luminous intensity increases when a supplied electric current increases, such as an incandescent lamp and LED (light-emission diode). In this case, the element-drive current is controlled in accordance with the distance between each element and the origin, as shown in FIG. 4. Thereby, a uniform stereoscopic image can be achieved. Further, it is also possible to control the light-emission time and element-drive current value together. Compared to the unit value of control (light-emission time and element current value) required when the light-emission time or element current value is controlled, the unit value in the case of controlling them together may be less specific and a similar smooth control can be obtained.

Figure 5:
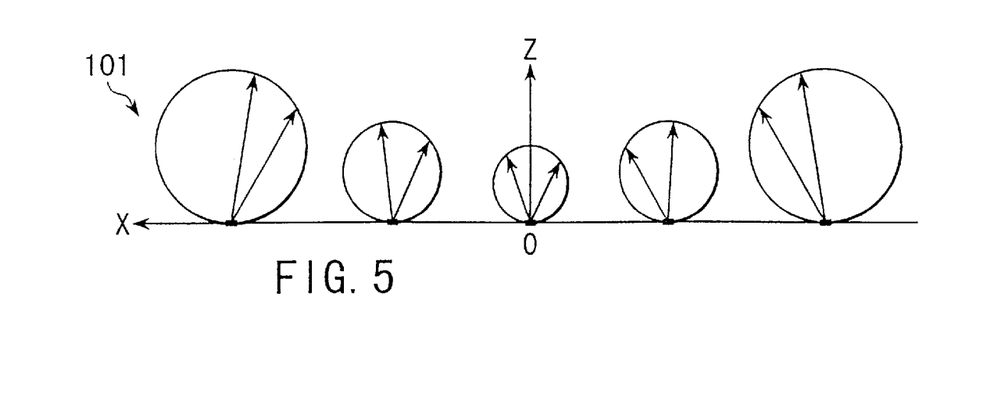
FIG. 5 is a diagram of luminance intensity versus the distance of the light source from the optical axis origin.

In the first embodiment of the present invention described above, the luminous intensity characteristics for each light-emission region of the light source is as shown in FIG. 5. The luminous intensity increases in accordance with an increase of the distance from the origin at the center of the light-emission region of the light source. Even if the viewer changes the viewing position, since the luminous intensity of a light-emission region distant from the origin is high, it can compensate brightness at the periphery of the viewed image, and thus the viewer can view an image with uniform brightness.

Further, though FIG. 5 shows the light-emission regions only in the X-axis direction (left-and-right direction) of for easy understanding, the viewer can view an image with uniform brightness, similarly in all the directions in the XY plane including Y-axis direction (up-and-down direction). Further, arrows in FIG. 5 typically indicate light radiation directions in effective ranges of light radiation which reach the viewer.

Figure 6:
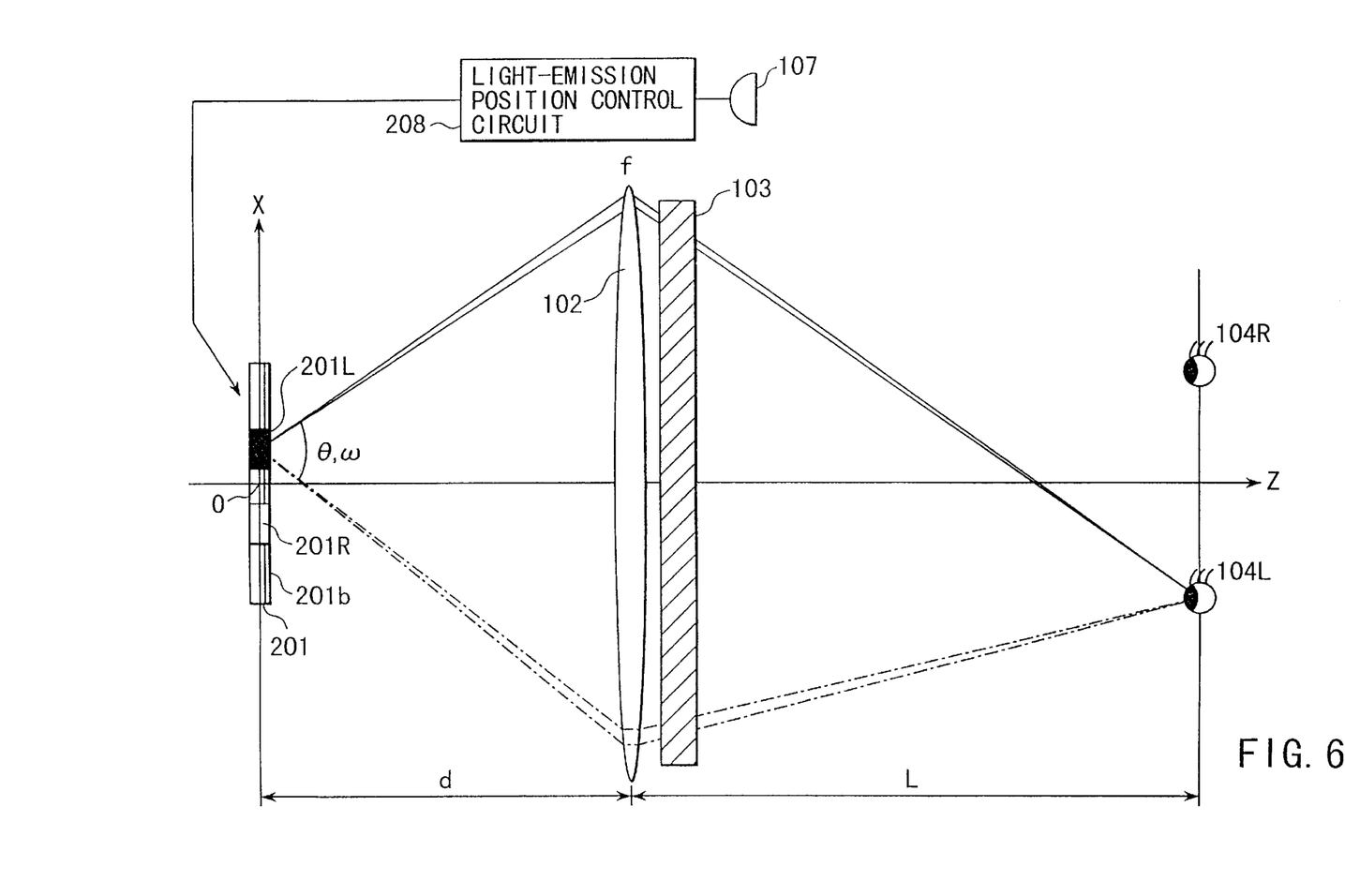
FIG. 6 is a schematic view of the structure of a stereoscopic image display device relating to a second embodiment of the present invention.

FIG. 6 is a schematic view of the structure of a stereoscopic image display device relating to a second embodiment of the present invention. The portions which are the same as those of the first embodiment are denoted by the same numeral as those in the first embodiment and an description thereof is omitted.

Figure 7:
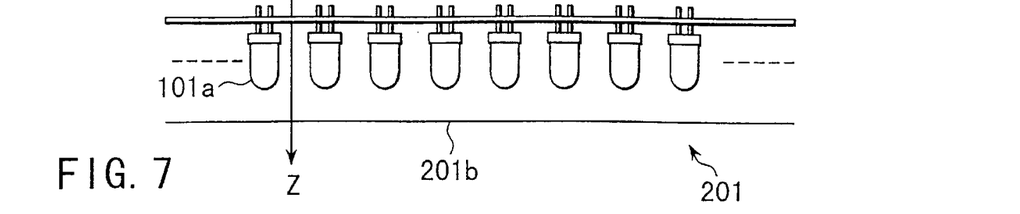
FIG. 7 is a diagram showing an example of the structure of the light source in FIG. 6.

In comparison with FIG. 1 showing the first embodiment, this second embodiment has the structure, as shown in FIG. 6, wherein the light-source control circuit 108 is replaced with a light-emission position control circuit 208, and the light source 101 with a light source 201. As shown in FIG. 7, this light source 201 comprises a plurality of lamps 101a formed in line in radiation regions and a diffusion board 201 which diffuses light from these lamps 101a with desired characteristics.

The light-emission position control circuit 208 receives a detection result from the sensor 107, selects lamps 101a which form light-emission regions of the light source 201 corresponding to the viewer's left and right eyes, and supplies current from an power source (not shown). Further, the diffusion board 201b of the light source 201 sets composite diffusion characteristics of a plurality of lamps 101a to desired characteristics. As an example of this diffusion board 201b, a diffusion sheet called "light shaping holographic surface relief diffuser" based on a surface relief hologram technique. This light shaping holographic surface relief diffuser is detailed in "Optical Alliance", June 1998, pp. 15ff.

Figure 8:
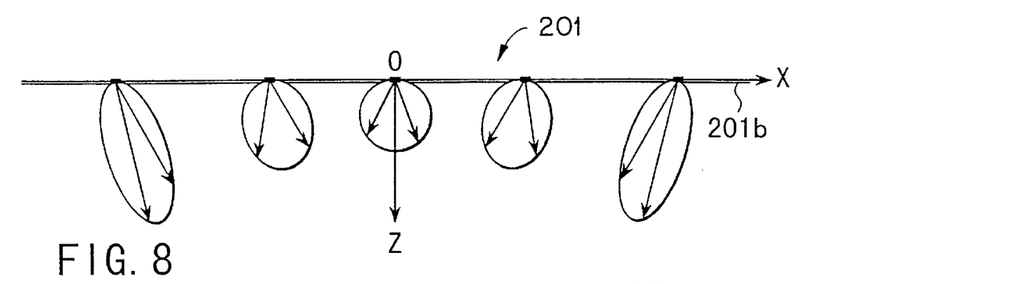
FIG. 8 is a graph showing the characteristic of light intensity versus the distance from the optical axis origin.

With respect to luminous intensity of each light-emission region of the light source 201, a desirable luminous intensity may be obtained by varying the diffusion characteristics of the diffusion board 201b for each light-emission region. In this case, a diffusion board 201b having such diffusion characteristics that diffusion distribution towards the optical axis (the Z-axis) becomes larger than that in a direction parallel to the optical axis in accordance with the distance from the optical axis extending from the center (origin) of the light source 201, as shown in FIG. 8. Thereby, such luminous intensity characteristics that the luminous intensity of emitted light increases in accordance with the distance from the origin O of the light source 201 can be obtained, and the viewer can view an image having uniform viewing illuminance.

Figure 9:
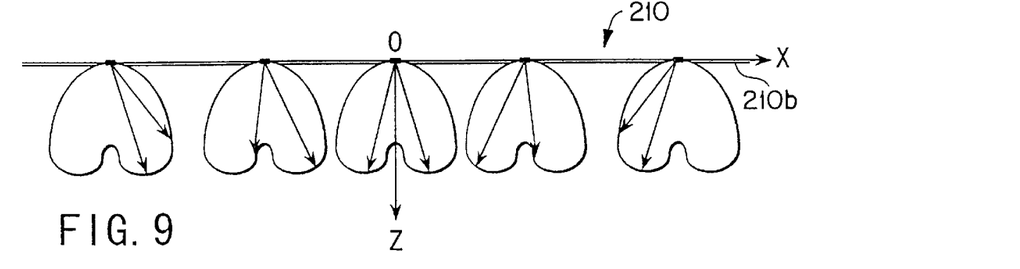
FIG. 9 is a graph showing the characteristic of light intensity versus the distance from the optical axis origin.

Further, as shown in FIG. 9, a diffusion board 210b having uniform composite diffusion characteristics regardless of positions of light-emission regions of the light source 201 may be used. In this case, a board having such diffusion characteristics that diffusion to both sides is larger than diffusion in the direction parallel to the optical axis of light from the light source 210b is used as the diffusion board 210b. Thereby uniform luminous characteristics can be obtained and the viewer can view an image having a uniform viewing illuminance.

Further, if the second embodiment and the first embodiment are used in combination by using the diffusion board 201b or 210b having desired characteristics instead of the diffusion board 101b in the first embodiment, more effect can be obtained. Specifically, as shown in FIGS. 8 and 9, the shape of luminous intensity distribution characteristics can be controlled, and the luminous intensity at the original light-emission regions obtained in the first embodiment can be magnified and reduced while keeping the shape of the luminous intensity distribution characteristics. Specifically, in the luminous intensity distribution characteristics shown in FIGS. 8 and 9, the form and size of the curve (curved surface when the Y-axis direction, too, is considered) defined between two arrows can be controlled. Thereby, a variation in viewing illuminance due to a shift of the viewer's position can be reduced, and simultaneously ununiformity of illuminance between pixels in the viewed image can be reduced.

Figure 10:
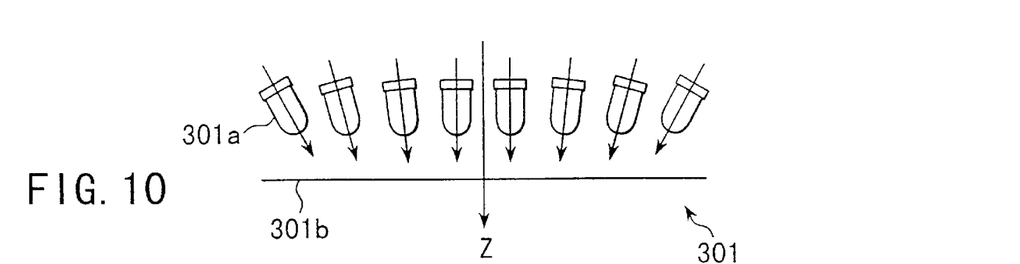
FIG. 10 is a diagram showing another example of the light source in the second embodiment.

Furthermore, a light source 301 which is another alternative of the light source 201 will be described. As shown in FIG. 10, the light source 301 comprises lamps 301a having a peak direction in radiation directivity of light, such as an incandescent lamp with a reflector and an LED, and diffusion 301b such as milky glass and board or light shaping holographic surface relief diffuser. Peaks of light radiation directivity of lamps 301a are denoted by arrows in FIG. 10. In this case, each of lamps 301a in the vicinity of the origin O in the center of light source 301 is mounted in the optical axis direction, and lamps 301a distant from the origin O are mounted to incline towards the optical axis (the Z-axis) of the origin O. By such mounting, the region close to the peak of light radiation directivity having a high luminous intensity of a lamp 301a distant from the origin O can be effectively used, and the illuminance at the image viewed by the viewer can be made uniform.

Figure 11:
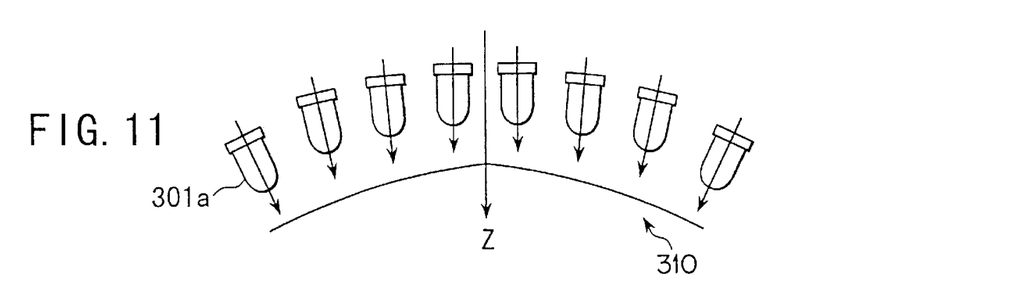
FIG. 11 is a diagram showing another example of the light source in the second embodiment.

Further, as shown in FIG. 11, lamps 301a may be arranged on a concave curved surface, which becomes convex in the negative direction of the optical axis (the Z-axis) in the center of the light source 310. According to light-emission regions with such arrangement of lamps 301a, optical path lengths of lamps 301a arranged in the positions distant from the optical axis in the center of light source 301 become shorter than those in the case where lamps 301a are arranged on a plane. Thereby, the embodiment has an advantage in respect of such illuminance characteristics of diffusion light source that the characteristics are inversely proportional to a square of the optical path length and the illuminance of the viewed image can be made uniform.

According to the second embodiment, even if the viewer changes the viewing position, since the luminous intensity of light emission region increases away from the origin in the center of the light source, it can compensate the shortage of brightness in the periphery of the viewed image, and the viewer can view a image with uniform brightness. Further, when this embodiment is used in combination with the first embodiment, the variation of illuminance of the viewed image due to the movement of the viewer and the ununiformity of the illuminance in the viewed image can be reduced.

Figure 12:
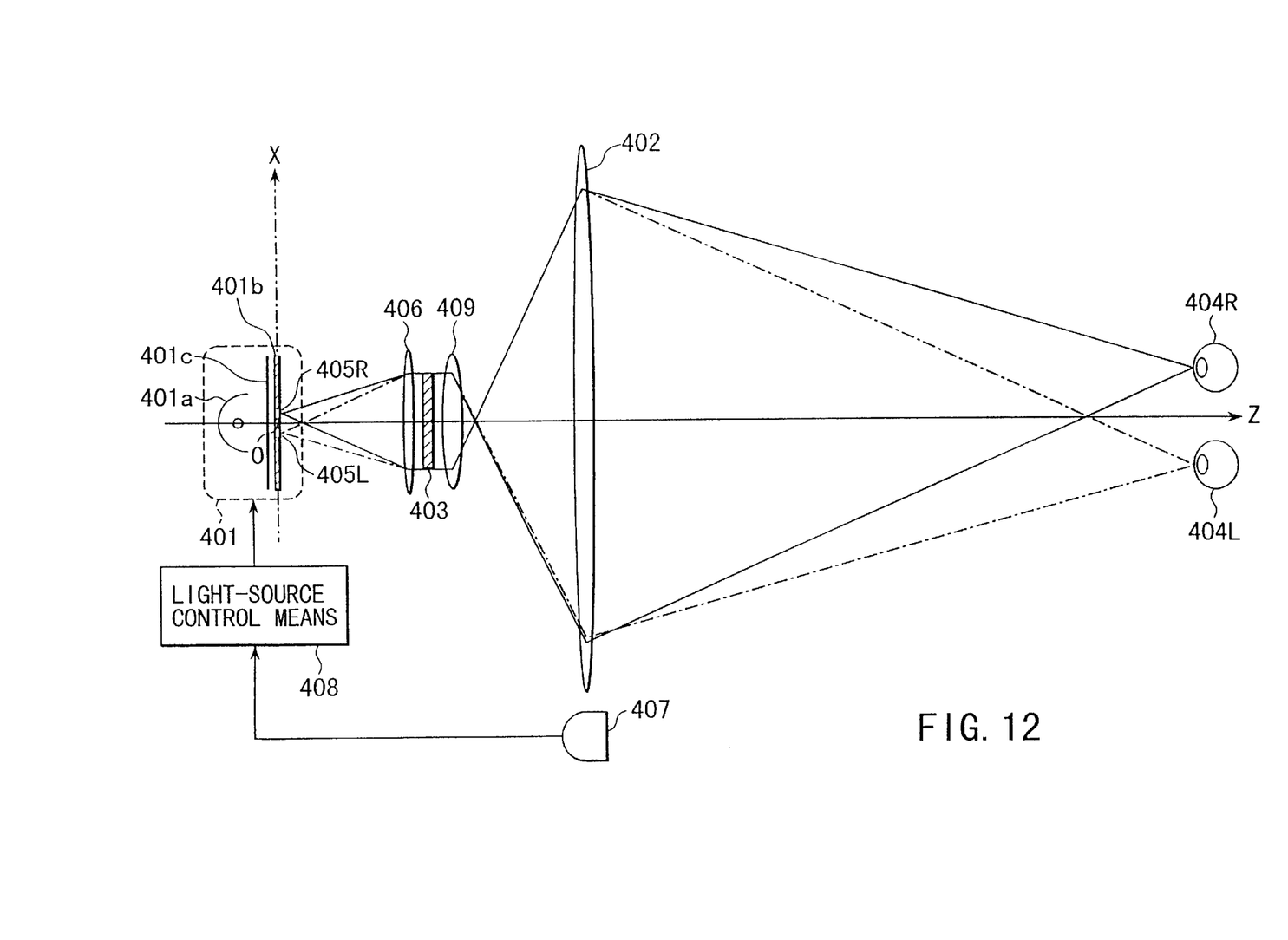
FIG. 12 is a schematic structural view of a stereoscopic image display device relating to the third embodiment of the present invention.

FIG. 12 is a schematic view of the structure of a stereoscopic image display device according to a third embodiment of the present invention. The first and second embodiment were described with an example of a stereoscopic image display device wherein a displayed image on a spatial modulation element is directly viewed. The third embodiment shown in FIG. 12 is described with an example of a rear-projection type stereoscopic image display device wherein a display image on a spatial modulation element is projected and displayed on a larger screen. In such a rear-projection type stereoscopic image display device, the problems stated in the prior are more remarkable, since it uses multi-stage optical element means and such a phenomenon, which is called "vignetting", that a beam is intercepted by a aperture of the former optical element means will occur conspicuously.

Light-emission regions 405L and 405R for viewer's left and right eyes 404L and 404R provided at a light source 401 emit diffusion light to first optical element means 406 formed of a convex lens such as a Fresnel lens which can be formed thin. This first optical element means 406 converts the diffusion light from the light-emission regions 405L and 405R to parallel light and radiates it to spatial modulation element means 403. The light spatial-modulated by the spatial modulation element means 403 is made incident on second optical element means 409 and projected on third optical element means 402 serving as a screen.

The third optical element means 402 formed of a thin convex lens such as a Fresnel lens condenses the modulated light projected by the second optical element means 409 to the vicinity of the viewer's left and right eyes 404L and 404R.

Control of image displayed on the spatial modulation element means 403 and operation of a sensor 407 which detects the viewer's position correspond to those in the first embodiment. A detection result of the sensor 407 is outputted to a light-source control means 408. The light-source control means 408 controls light-emission region shutter means 401b so as to set light-emission regions 405L and 405R to coincide with regions corresponding to viewer's left and right eyes, on the basis of the detection result of the sensor 407. For example, the light-emission region shutter means 401b is formed of a black-and-white liquid crystal panel, and disposed in the XY plane. Specifically, when a left-eye image is displayed on the spatial modulation element means 403, the light-emission region shutter means 401b controls the light-emission region 405L to a transmission state, and the other regions (including the light-emission region 405R) to a non-transmission state. Further, when a right-eye image is displayed, the light-emission region shutter means 401b controls the light-emission region 405R to a transmission state, and the other regions (including the light-emission region 405L) to a non-transmission state.

Figure 13:
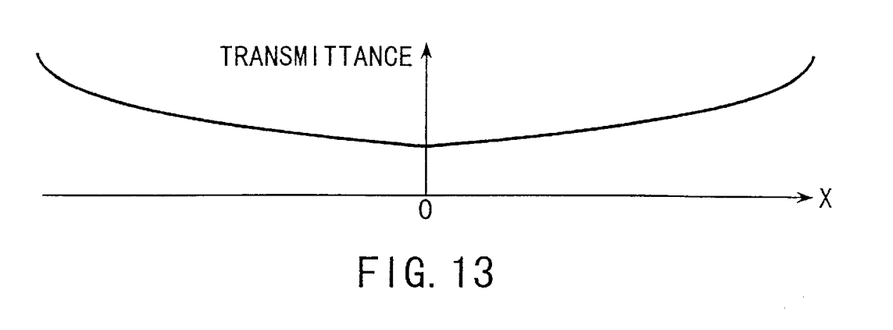
FIG. 13 is a graph showing the characteristic of transmissivity versus the distance of the variable concentration transmission board from the origin.

On the other hand, a fluorescent lamp can be used as a diffusion-surface light emitter 401a of the light source 401, for example. This light emitter 401a has angle distribution characteristics of an almost uniform luminous intensity with respect to regions opposing the regions covered by the light-emission region shutter means 401b. Between the diffusion-surface light emitter 401a and light-emission region shutter means 401b, a variable-concentration transmission board 401c serving as transmission means is provided, which has high transmittance in accordance with the distance from the optical axis of the origin O in the center of light source 401, as shown in FIG. 13. Further, the variable-concentration transmission board 401c may be removed and the transmittance of the transmission regions 405L and 405R of the light-emission region shutter means 401b may be controlled to have a value in FIG. 13.

Figure 14:
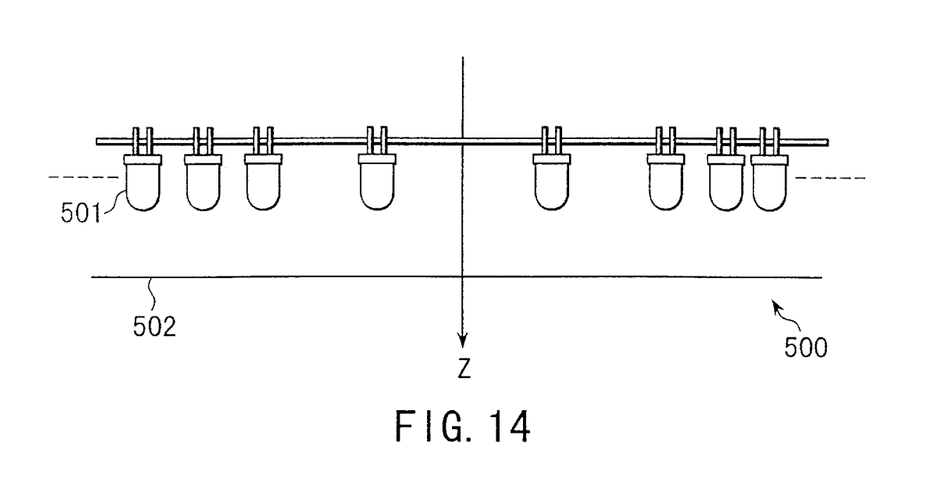
FIG. 14 is a diagram showing another example of the structure of the light source in the third embodiment.

Further, other alternatives of the diffusion-surface light emitter 401a and variable-concentration transmission board 401c in the light source 401 will be described. FIG. 14 is a diagram showing a diffusion-surface light emitter 500, wherein a plurality of light-emitting elements 501 such as lamps and LED are used, instead of diffusion-surface light emitter 401a and variable-concentration transmission board 401c, and a diffusion board 502 is mounted in a light radiation direction thereof. The light-emitting elements 501 are less densely arranged in the vicinity of the optical axis of the origin O, and arranged with higher density as the distance from the optical axis increases. These light-emitting elements 501 are supplied with current from a power source (not shown) so that all the light-emitting elements 501 may emit light under the same condition. Therefore, when this diffusion-surface light emitter 500 is viewed from the plus side in the direction of the Z-axis, a diffusion-surface light-emission region can be achieved wherein the brightness at the optical axis is lowest and the brightness becomes higher as the distance from the optical axis increases.

According to the third embodiment, even if the viewer changes the viewing position, the shortage of illuminance due to the change of the viewing position can be compensated since the luminous intensities of the light-emission regions 405L and 405R become higher as the distance from the optical axis origin 0 increases.

Though the above embodiments have been described with an example of a stereoscopic image display device wherein a spatial modulation element is used for both left and right eyes and left and right images are switch-displayed by time sharing, the same is applicable to a stereoscopic image display device wherein the left-eye spatial modulation element and right-eye spatial modulation element are separately used.

According to the above, even if the viewer changes the viewing position, a viewed image does not become dim and the viewer can view a stereoscopic image with uniform brightness.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stereoscopic image display device for providing a stereoscopic image by displaying images with a parallax on a viewer's left and right eyes, comprising:

a light source having selectively variable light-emitting regions for emitting light, the light-emitting regions being disposed at various positions from a center of the light source;

an optical element having an optical axis extending through the center of the light source for condensing light emitted from the light source to each of the viewer's left and right eyes;

spatial modulation means, disposed on an optical path from the light source to the viewer, for spatially modulating the light emitted from the light source; and control means for controlling a light-emission state of the light source so that brightness of the light-emitting regions increases as the positions of the light-emitting regions become distant from the optical axis, in order to obtain a uniform viewing illuminance of the light viewed by the viewer even when a viewing point of the viewer changes and the positions of the light-emitting regions move.

2. The stereoscopic image display device according to claim 1, further comprising a diffusion sheet is disposed on an optical path in a vicinity of the light source such that the diffusion sheet transmits light from the light-emitting regions, wherein the diffusion sheet has diffusion characteristics such that the transmission of light increases as the positions of the light-emitting regions become more distant from the optical axis.

3. The stereoscopic image display device according to claim 1, wherein the light-emitting regions of the light source comprise a plurality of light-emitting elements that are more densely arranged as a distance from the optical axis increases.

4. The stereoscopic image display device according to claim 1, wherein the light-emitting regions of the light source have diffusion distributions that are increasingly biased directionally towards the optical axis as the distance of the light-emitting regions from the center of the optical axis increases.

5. The stereoscopic image display device according to claim 1, wherein the light-emitting regions of the light source comprise a plurality of light-emitting elements that radiate maximally in a peak direction, and wherein the peak direction is increasingly inclined toward the optical axis as the distance of the light-emitting region from the optical axis increases.

6. The stereoscopic image display device according to claim 1, further comprising a diffusion sheet disposed on an optical path in a vicinity of the light source such that the diffusion sheet transmits light from the light-emitting regions, the diffusion sheet having diffusion characteristics such that the intensity distribution of the transmitted light has a concave cross section.

7. The stereoscopic image display device according to claim 1, wherein the control means controls a light-emission time of the light-emitting regions such that the light emission time is shorter at the center of the light source and becomes longer as a distance from the center of the light source increases.

8. The stereoscopic image display device according to claim 1, wherein the control means causes the supply of more light-emission energy as a distance from the center of the light source increases.

9. The stereoscopic image display device according to claim 1, wherein the light-emitting regions are arranged on a concave curved surface.

10. The stereoscopic image display device according to claim 1, wherein the control means controls the light-emission state of the light source to obtain a uniform viewing illuminance of the light condensed to the viewer's viewing position even for slight changes in a position of the viewer.

11. The stereoscopic image display device according to claim 1, wherein the control means controls a light-emission state of the light source to obtain such a luminous intensity that the light emitted from the light source to the spatial modulation means is uniform in intensity.

12. The stereoscopic image display device according to claim 1, further comprising a screen disposed on an optical path between the spatial modulation means and the viewer.

* * * * *